March 31, 1959  R. R. RICHARDSON ET AL  2,879,700
CELLULAR TRAY FORMING AND ASSEMBLING MACHINE
Filed Oct. 24, 1955  10 Sheets-Sheet 1

Inventors:
Ralph R. Richardson
John F. Castner
By Soans, Glaister + Anderson
attys.

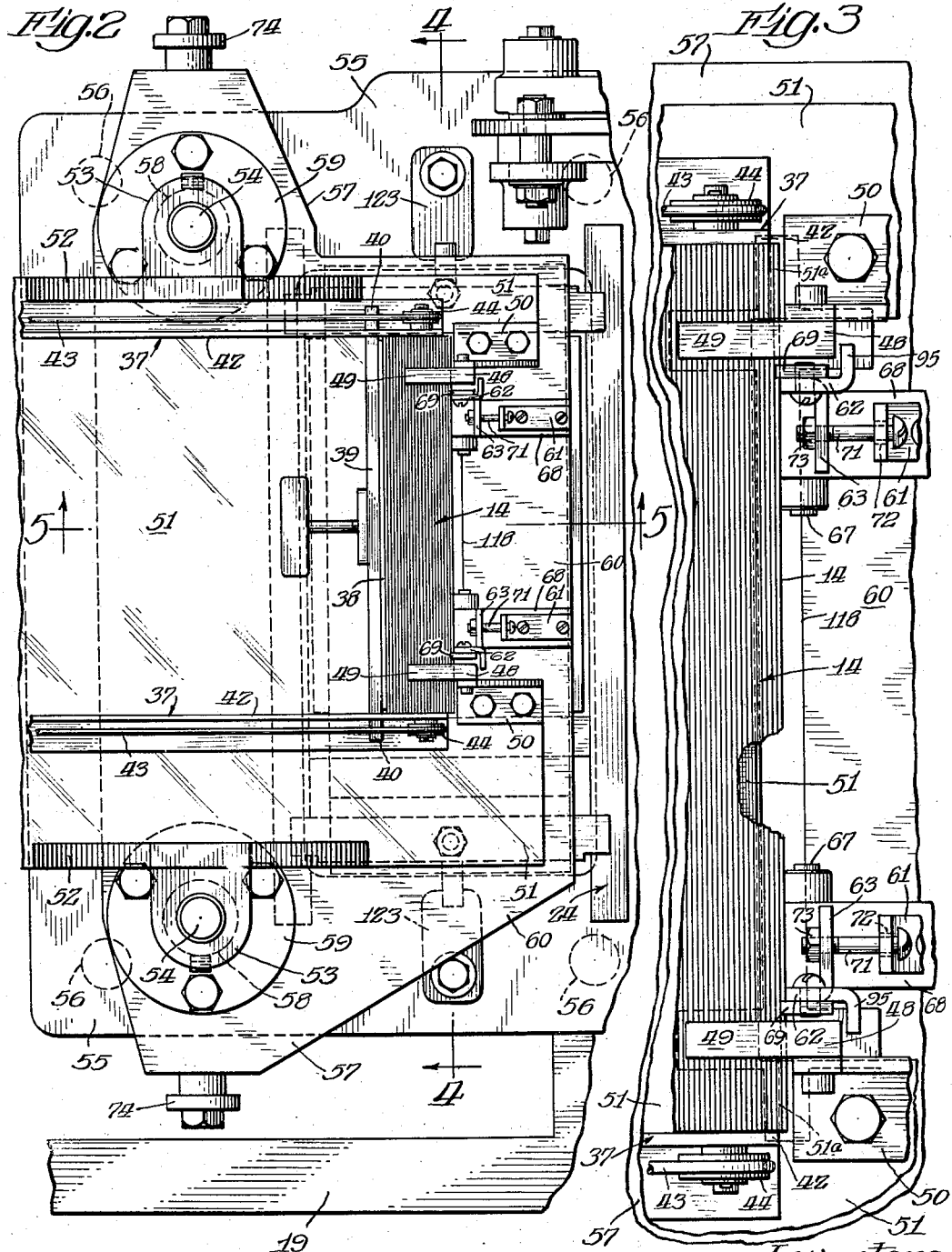

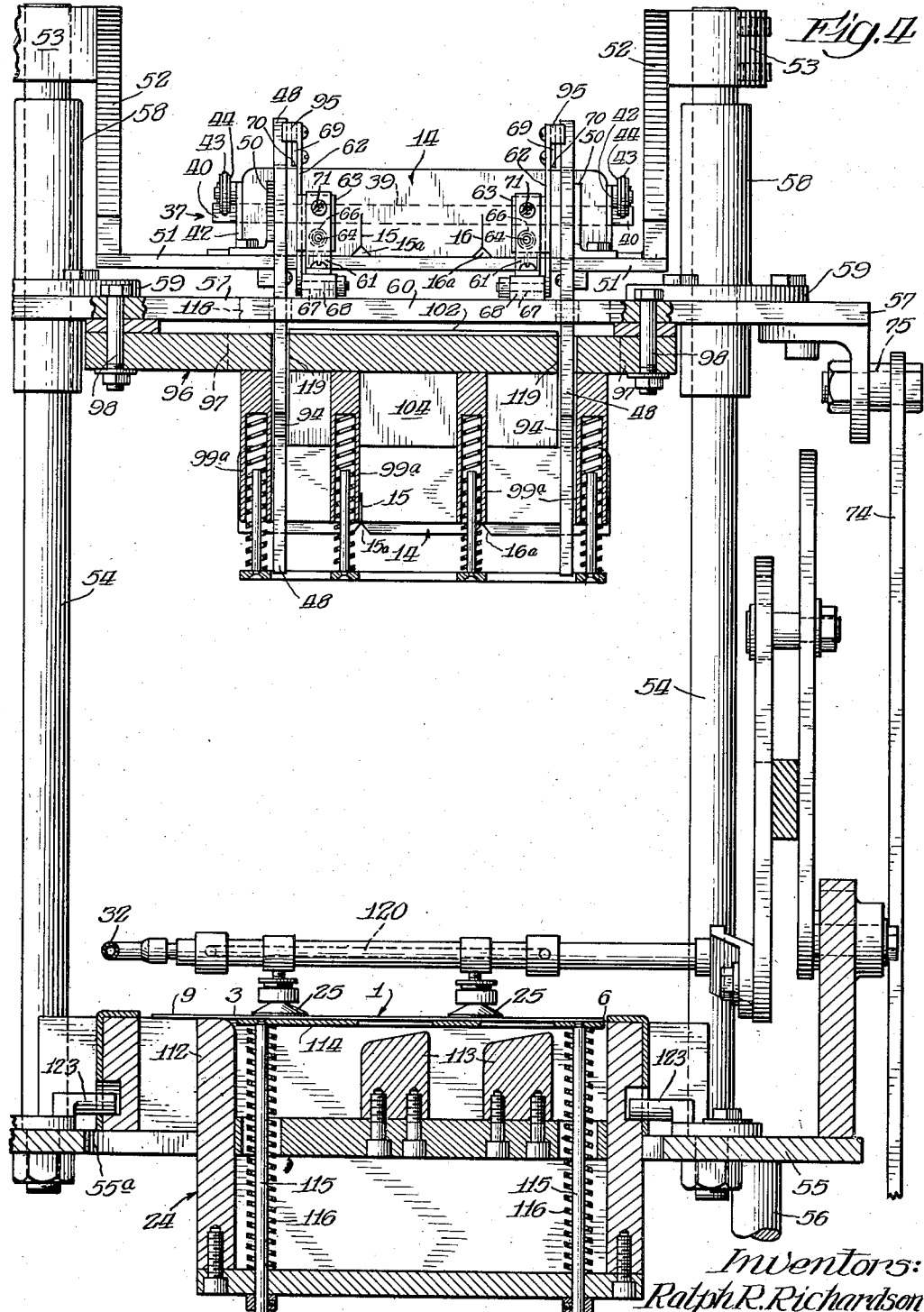

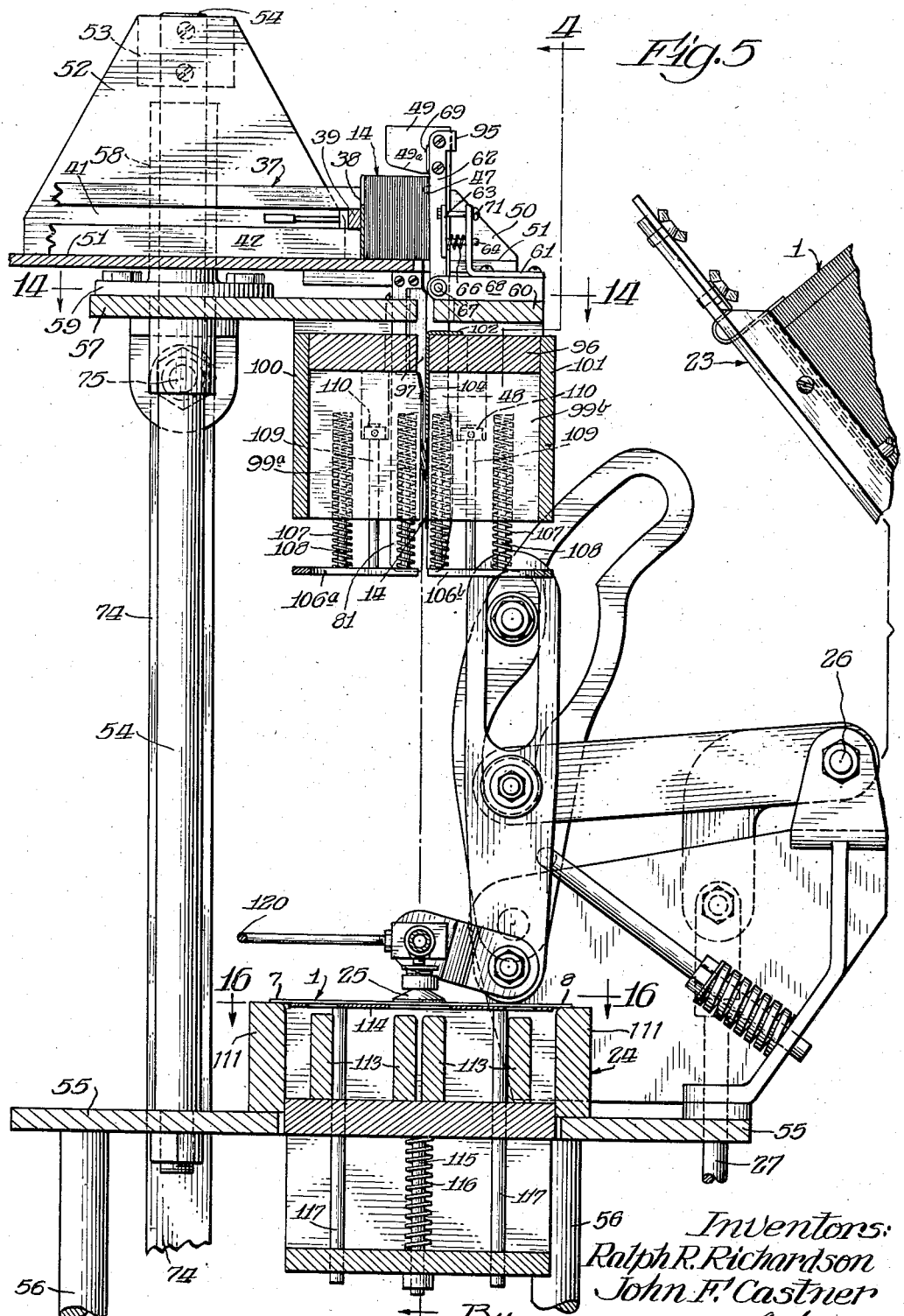

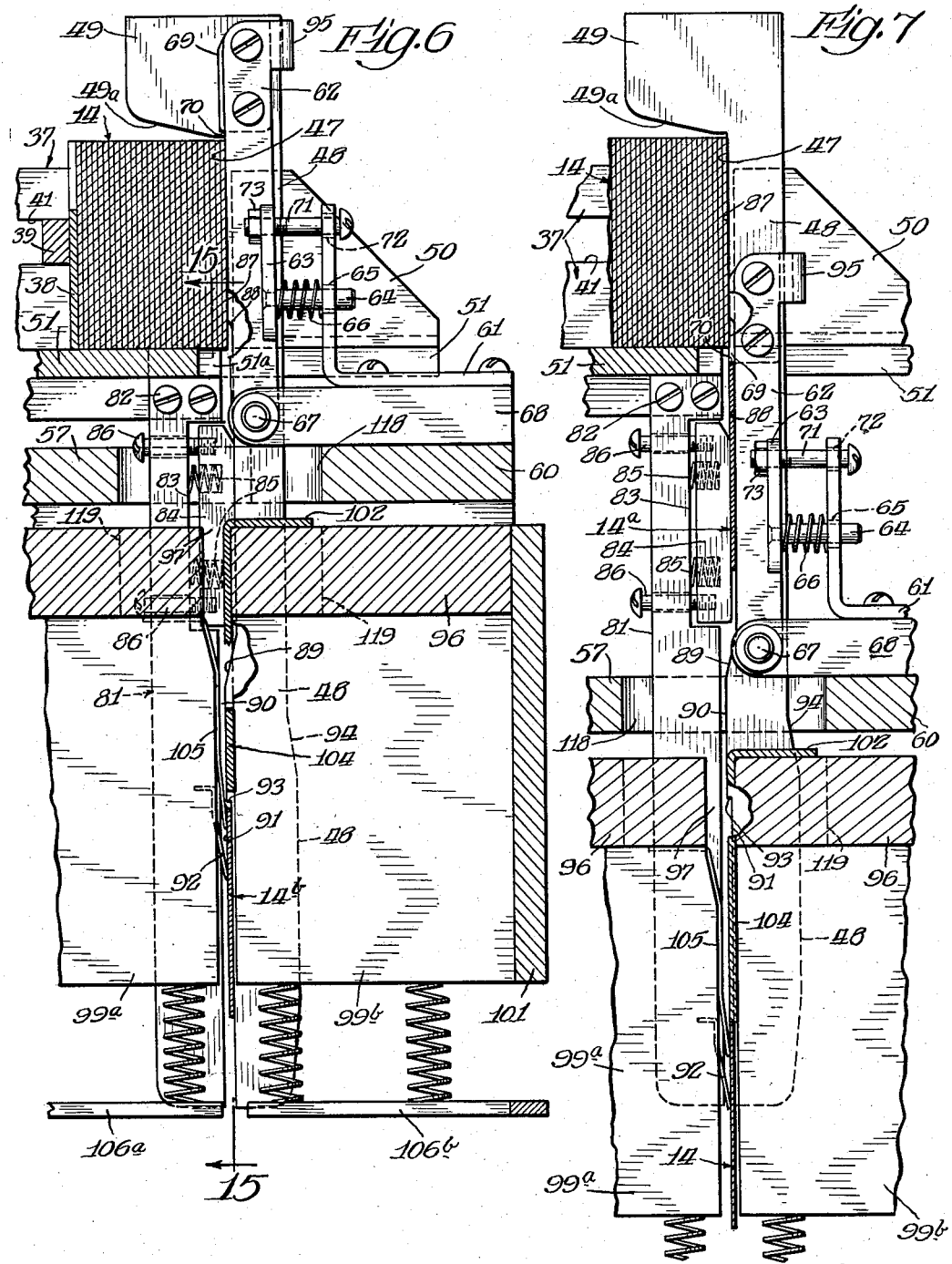

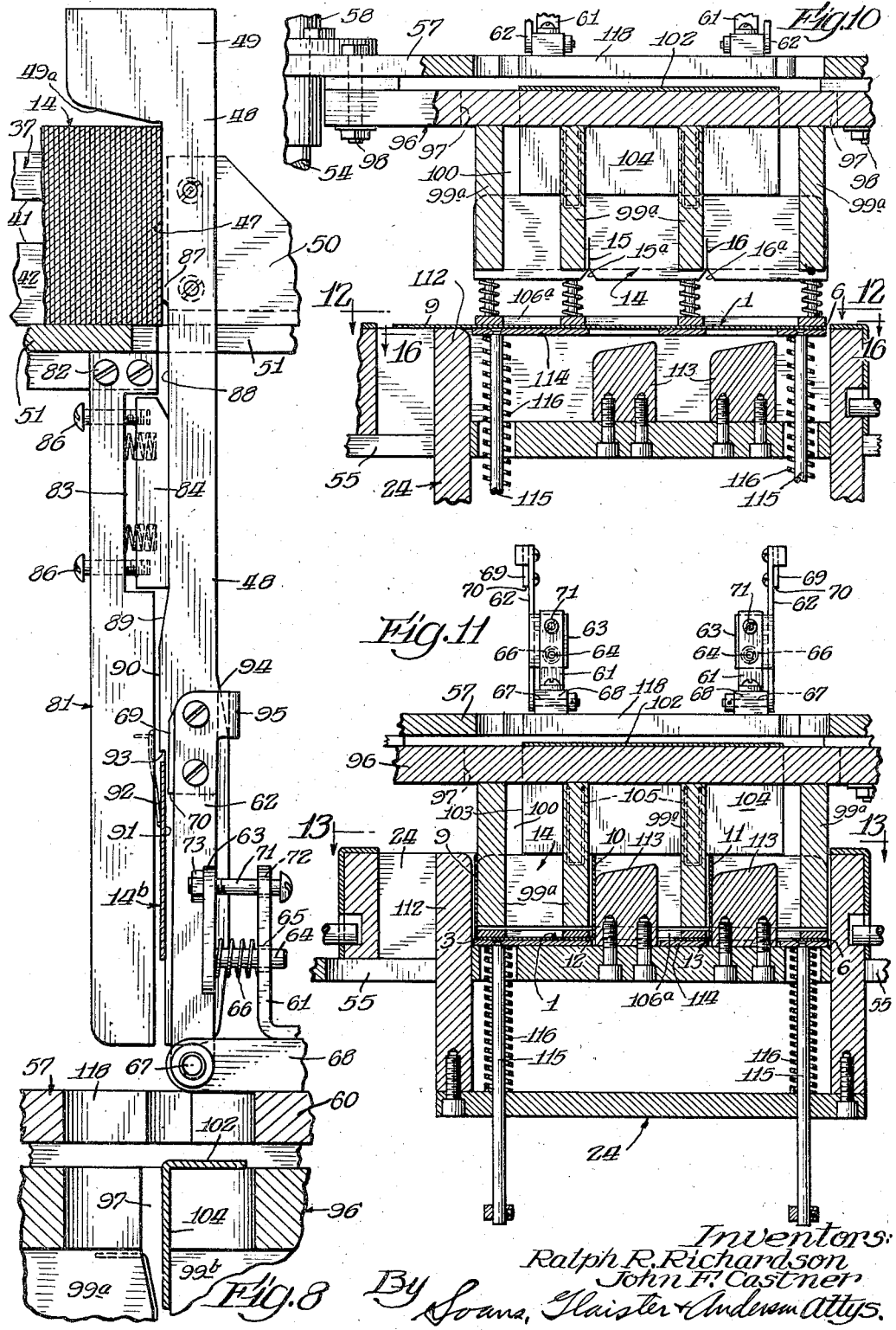

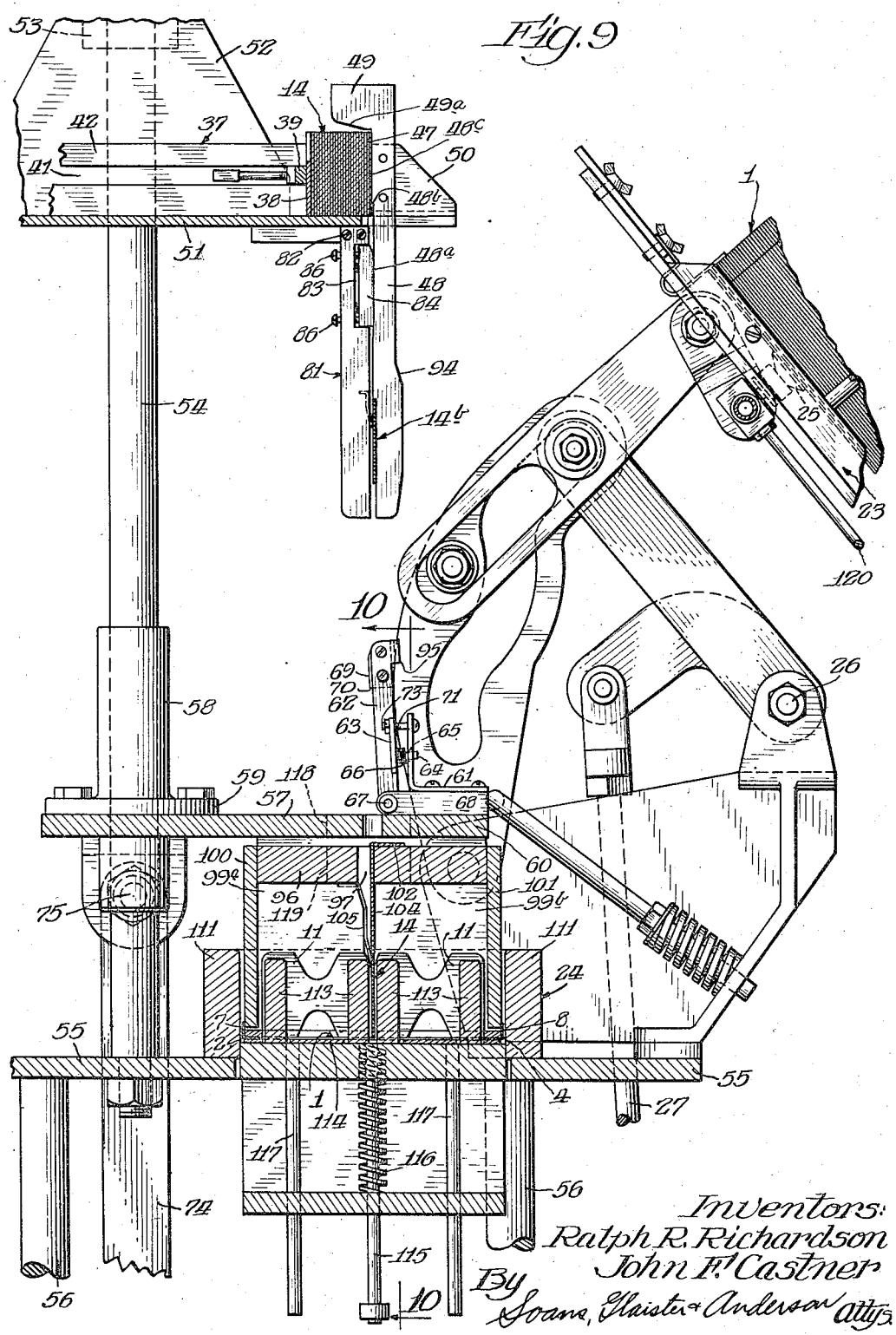

March 31, 1959 R. R. RICHARDSON ET AL 2,879,700
CELLULAR TRAY FORMING AND ASSEMBLING MACHINE
Filed Oct. 24, 1955 10 Sheets-Sheet 8

Inventors:
Ralph R. Richardson
John F. Castner
By Soans, Glaister & Anderson Attys

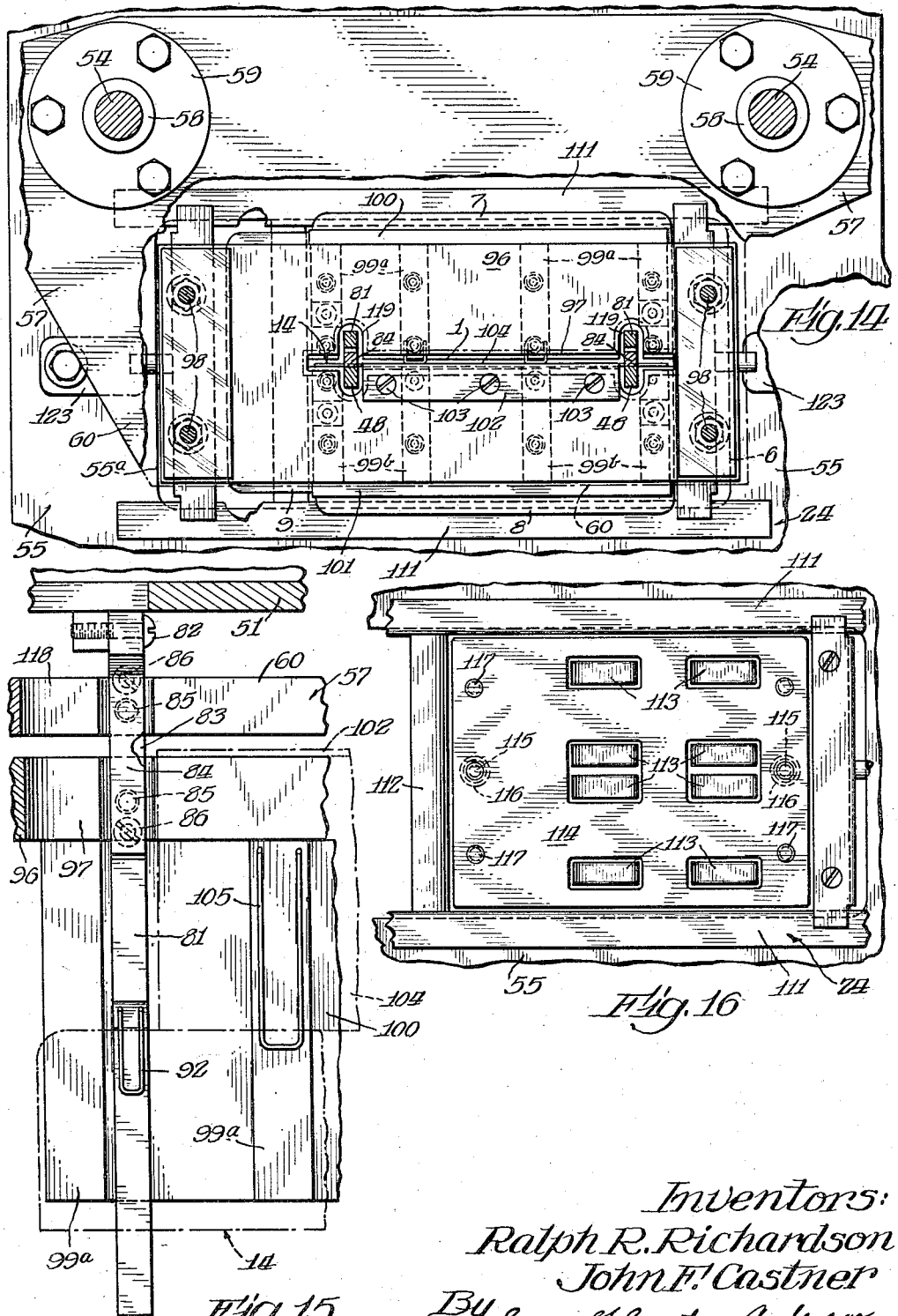

March 31, 1959 R. R. RICHARDSON ET AL 2,879,700
CELLULAR TRAY FORMING AND ASSEMBLING MACHINE
Filed Oct. 24, 1955 10 Sheets-Sheet 10
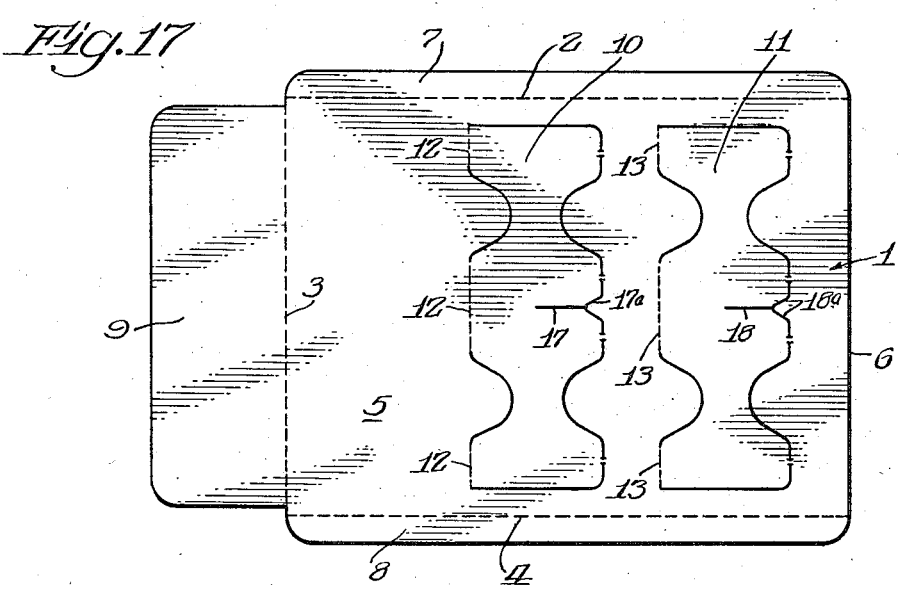
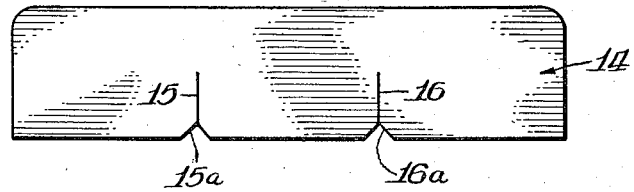
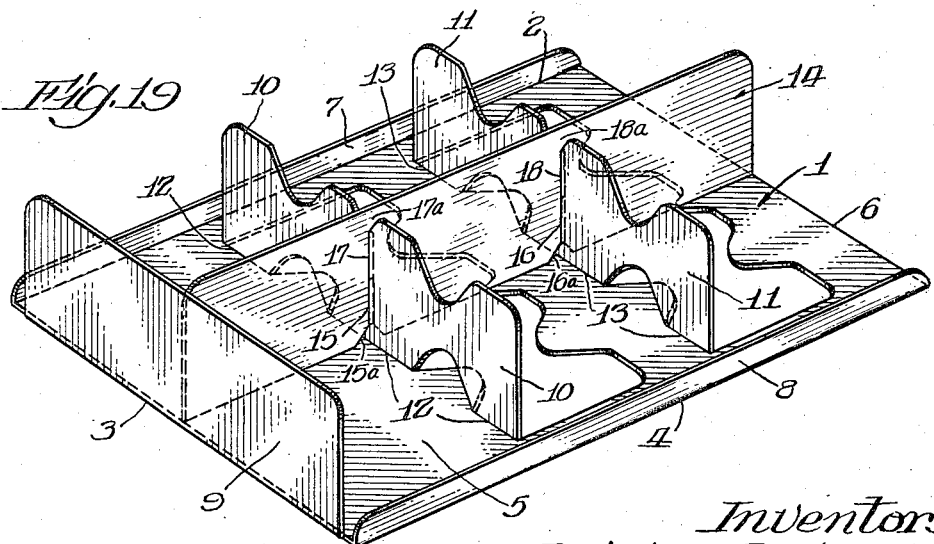
Inventors:
Ralph R. Richardson
John F. Castner
By Soans, Glaister + Anderson Attys.

United States Patent Office 2,879,700
Patented Mar. 31, 1959

2,879,700

CELLULAR TRAY FORMING AND ASSEMBLING MACHINE

Ralph R. Richardson, Chicago, and John F. Castner, Cicero, Ill., assignors to United Biscuit Company of America, a corporation of Delaware Application October 24, 1955, Serial No. 542,166

9 Claims. (Cl. 93—37)

This invention relates to machines for setting up cellular trays or the like, which comprise a main body member having one or more partitions folded into upstanding position from a bottom panel and an insert or divider which is assembled with such partitions to form a cellular tray.

The main objects of the invention are to provide a machine for automatically assembling into operative relationship, the separate components of a tray of the character indicated and for folding or otherwise forming such components as require folding or forming; to provide an apparatus for the purpose indicated which is of relatively simple character; to provide such a machine which is highly reliable in operation so that the machine need receive but a minimum amount of attention from an attendant; to provide a machine of the character indicated which operates quietly and at high speed; and, in general, it is the object of the invention to provide an improved machine of the character indicated.

Other objects and advantages of the invention will be understood by reference to the following specification and the accompanying drawings (10 sheets) in which there is illustrated a selected embodiment of a machine for setting up a tray of the character set forth.

In the drawings:

Fig. 2 is a plan;

Fig. 3 is an enlargement of a portion of Fig. 2;

Fig. 4 is a view partly in section and partly in elevation on a plane approximately as indicated by the lines 4—4 in Figs. 2 and 5;

Fig. 5 is a section on the line 5—5 in Fig. 2;

Figure 1:
Fig. 1 is a side elevation of the machine.

Figs. 6, 7, 8 and 9 are fragmentary sections respectively corresponding to portions of Fig. 5. Figs. 6, 7 and 8 are on an enlarged scale relative to the scale of Fig. 5; Fig. 6 shows the parts in the position of Fig. 5, and Figs. 7, 8 and 9 show successive advanced positions of some parts;

Figs. 10 and 11 are sections approximately on the plane represented by the line 10—10 in Fig. 9, Fig. 11 showing the parts in the same position as in Fig. 9, and Fig. 10 representing the parts in a preceding position.

Fig. 12 is a plan section on the line 12—12 of Fig. 10;

Fig. 13 is a plan section on the line 13—13 in Fig. 11;

Fig. 14 is a plan section on the line 14—14 in Fig. 5;

Fig. 15 is a vertical section approximately on the plane represented by the line 15—15 in Fig. 6;

Fig. 16 is a plan section on the plane represented by the line 16—16 in Fig. 10;

Fig. 17 is a plan of the main body blank of a tray which is formed and assembled by the illustrated apparatus;

Fig. 18 is a plan of a divider element which is assembled with the blank shown in Fig. 17 after the latter is folded to predetermined condition; and, Fig. 19 is a perspective illustration of the formed and assembled cellular tray which is formed and assembled by the apparatus illustrated.

The tray structure illustrated in Figs. 17-19 is the subject matter of an application heretofore filed by other inventors, and said tray structure is herein illustrated and described for the purpose of facilitating explanation of the apparatus herein shown. Said tray structure comprises a main body member 1 which is provided with suitably formed fold lines 2, 3 and 4 which define a main bottom panel 5 bounded by said fold lines 2, 3 and 4 and one free end 6 of the blank. Said fold lines 2, 3 and 4 also cooperate with adjacent edge portions of the blank to define foldable marginal side panels 7 and 8 respectively, and a foldable marginal end panel 9. The bottom panel 5 is suitably slitted and scored to define transverse partition panels 10 and 11 which are hingedly connected to the bottom panel 5 along suitable score or fold lines 12 and 13 respectively. Said partition panels 10 and 11 are displaceable from the bottom panel 5 by being folded along their respective fold or hinge lines 12 and 13 to upstanding position substantially as shown in Fig. 19. As shown in Fig. 19, the end panel 9 is also folded along the fold line 3 to upstanding relation to the bottom panel 5, and the side wall panels 7 and 8 are also folded to vertically upstanding relation to the bottom panel 5. The end panel and the transverse partitions are substantially parallel to each other as are also the side wall panels 7 and 8.

The tray element illustrated in Fig. 18 is a longitudinal divider or partition 14 which is suitably slitted as indicated at 15 and 16 to receive the thickness of the transverse panels 10 and 11. The slits 15 and 16 are provided with flared mouths or entrances as indicated at 15a and 16a to facilitate proper alignment of the slits 15 and 16 with the partitions 10 and 11 respectively. Said partitions 10 and 11 are also provided with suitable slits 17 and 18 respectively for receiving the thickness of the divider 14 above the slots 15 and 16 therein. Suitable flared entrances or mouths 17a and 18a are also provided in the upper margins of the transverse partitions 10 and 11 to aid in guiding the divider 14 into assembled relation to the transverse partitions.

The apparatus for forming and assembling the trays comprises a suitable frame structure 19 in which there is suitably mounted an electric motor 20 to provide driving power and a suitable suction pump 21 driven by another electric motor 22. The suction pump 21 provides suction or vacuum in mechanism for feeding blanks 1 from a stack in a magazine 23 to predetermined position overlying a forming die structure 24.

The magazine 23 may be of any suitable or known construction which will support a stack of the blanks 1 as represented in Fig. 1 in such a manner that a blank may be withdrawn facewise from the lower end of the stack by feeding mechanism which includes the vacuum grippers 25. The vacuum grippers 25 are oscillated from a starting position against the lowermost blank in the magazine as shown in Fig. 9 to a blank delivering position immediately above the forming die 24 as shown in Figs. 1 and 5.

The details of the blank feeding mechanism are not a part of the present invention and therefore will not be specifically described. For the purpose of explaining the present invention, it is sufficient to point out that the vacuum grippers 25 are carried by suitable mechanism which is pivotally mounted at 26 on a normally fixed axis supported by the frame structure and that the vacuum gripper carrying mechanism is rocked back and forth between said positions by means of a connecting rod 27 which interconnects an arm portion of said gripper carrying mechanism and a crank arm 28 which is rotated at appropriate speed. The crank arm 28 is driven by a belt drive 29 from the motor 20, said crank arm being suitably geared to a counter shaft 30 which is directly driven as illustrated and which shaft is the input shaft of a transmission gear box 31.

Suction or vacuum in the grippers 25 is produced by the said suction pump which is connected by a flexible hose connection 32 and suitable piping 33 to the grippers 25. A manually controllable valve 34 and also an automatically actuated valve 35 is provided in said suction line 33. During normal operation of the machine the valve 35 automatically establishes and cuts off suction in the gripper 25 in properly timed relation for withdrawing a blank from the magazine 23 and delivering it to the die structure 24. The valve 34 permits shutting off of the suction connection through the automatic valve 35 and manual control of vacuum for manual operation of the machine for adjusting and similar purposes. A hand wheel 36 secured to one end of the shaft 30 facilitates manual operation or inching of the machine for adjustment and trial purposes.

A magazine 37 is suitably supported for supporting a stack of the divider blanks 14. The blanks 14 are supported on edge in vertical planes in a horizontally extending stack (see Figs. 2 and 5) in front of a follower plate 38. The follower plate 38 is secured to a cross bar 39 which has end portions 40 extended outwardly through slots such as indicated at 41 in the opposite sides 42 of the divider magazine 37. The projecting ends 40 of said cross bar 39 are connected to flexible cords 43 (see Figs. 1 and 2) which extend forwardly from said cross bar ends and then upwardly around pulleys 44 which are rotatably mounted on the forward end portions of the magazine sides 42. The cords 43 extend rearwardly over pulleys such as indicated at 45 (Fig. 1) and thence downwardly to suitably counter-weights 46 which serve to yieldingly urge the follower 38 to move forwardly to thereby hold the foremost blank 14 in engagement with the vertical edges 47 of a pair of horizontally spaced guide bars 48 (Figs. 2 and 7).

The guide bars 48 have rearwardly extending upper end portions 49 which overhang the forward end portion of the stack of blanks 14 in the magazine, said overhanging guide bar portions being provided with suitably inclined lower edge surfaces 49a for guiding the forward end portion of the stack into proper position against the said guides 48.

The guides 48 are fixedly mounted through the agency of suitable angle brackets 50 on side portions of a plate 51 which provides the bottom of the magazine 37. Said bottom plate 51 is suspended in fixed position by hanger brackets 52 (Fig. 4) which are secured as indicated at 53 on the upper end portions of a pair of vertical posts 54. The posts 54 are securely and fixedly supported on a table plate 55 (Fig. 1) which is fixedly supported by posts as indicated at 56 from suitably provided portions of the main frame 19.

A cross head plate 57 beneath said magazine 37, is vertically slidably mounted on said posts 54 through the agency of sleeves such as indicated at 58 (Fig. 4) which slidably fit on said posts 54 and are provided with flanges 59 to which said cross head plate 57 is suitably bolted or otherwise secured. Said cross head plate 57 has a portion 60 which extends laterally forwardly beyond the guide bars 48 to carry certain instrumentalities (see Figs. 1 and 2).

One of said instrumentalities comprises means for feeding the blanks 14 downwardly, one by one, from said magazine. Such feeding means comprises (see Figs. 6, 2 and 4) a pair of angle members 61 which are fixedly mounted on said plate portion 60, and which angle members horizontally slidably guide divider blank feed members 62. These feed members 62 are vertically elongated strap-like elements each of which has an ear 63 which extends laterally into overlapping relationship to the upstanding leg of one of the angle members 61. Each ear 63 has rigidly secured to it a pin 64 which extends through an opening 65 in the upstanding leg of said bracket 61. A coil spring 66 around said pin is under a predetermined amount of compression between the ear 63 and the angle bracket and yieldingly urges the feed bar 62 to move toward the stack of blanks 14 in the magazine. At its lower end the feed bar 62 is pivoted as shown at 67 to the end of an arm 68 which is supported by the portion 60 of the cross head plate 57 and on which said angle brackets are mounted as best shown in Figs. 4 and 6. The upper end of each feed bar 62 has secured to it an abutment member 69 which has a marginal portion arranged to project beyond the divider blank engaging edge of the member 62 a distance just slightly less than the thickness of a divider blank. It will be understood that when the feed bar 62 is moved downwardly the abutment end 70 of the element 69 on each of the feed bars will be operative to engage the upper edge of the blank 14 to initiate its downward movement. The blanks adjacent to the foremost blank in the magazine 37 are supported against downward movement by side portions 51a (Figs. 6 and 3) of the magazine bottom 51.

Movement of the respective arms 62 by the force of the respective springs 66 is limited by means of a screw 71 which is slidable in an opening 72 in the vertical leg of the angle member 61, said screw being fixedly secured to the ear 63 by being threaded into a suitably tapped opening in the ear and locked in place by a lock nut 73. The head of the screw serves as a stop for engaging the vertical leg of the angle member 61 when the desired limit of rocking movement of the said feed arm 62 is reached.

Vertical reciprocation is imparted to the cross head plate 57 and the parts carried thereby by means of a pair of links 74 (Figs. 1 and 4) which have their upper ends pivotally connected as indicated at 75 to suitable lugs which depend from the cross head 57. The lower ends of said links 74 are pivoted as indicated at 76 to the free ends of suitably counterbalanced crank arms 77 which are carried on the ends of a shaft 78 which is suitably rotatably mounted on a portion of the frame structure 19 as indicated in Figure 1. This shaft 78 is normally driven continuously by a chain drive connection 79 to an output shaft of the previously mentioned gear box 31.

The downward movement imparted to the feed bars 62, acting through the shoulders 70 of the abutment elements 69 (Figs. 6 and 3), feeds a blank from its starting position at the discharge end of the magazine 37, downwardly into a guide-way formed between depending portions of each of said guide bars 48 and complementary members 81 which are suitably suspended as indicated at 82 from the fixed magazine bottom plate 51. The complementary guide members 81 are each recessed as indicated at 83 to horizontally movably receive a pressure bar 84 which is urged by springs 85 to move toward the adjacent edges of the guide bars 48. Each pressure bar 84 is suitably guided and limited in its movement away from the guide bar 81 by a pair of headed screws 86 which are threaded into the pressure bar 84 and which are slidable through suitable holes provided in the guide bar 81. If desired, the screws 86 may be adjusted to limit the pressure with which the pressure bars 84 hold a divider blank 14 against the guide bars 48 as will hereinafter be explained, but if the springs 83 are properly chosen, critical adjustment of these screws 86 is usually unnecessary.

Upon downward movement of the cross head plate 57 and the parts carried thereby, the shoulder 70 of the abutment member 69 will engage the upper edge of the foremost divider blank 14 and force it downwardly in the guide-way between the guide members 48 and 81. While the feeding structure is in elevated position as shown in Fig. 6, the foremost blank 14 is held against gravitating downwardly by reason of the pressure provided by the counter-weights 46 whereby said foremost blank 14 is held snugly against the adjacent upper portion 87 of the edge 47 of the guide member 48. The pressure is not, however, great enough to prevent edgewise downward displacement of the blank under the force of the feeding member 69.

As the feed mechanism proceeds downwardly the blank 14 being fed downwardly will reach an intermediate position represented at 14a in Fig. 7 in which the blank is seated against a portion 88 of said edge 47 of the guide member 48. Said edge portion 88 is recessed relative to the upper edge portion 87 and this recessed edge area 88 is highly beneficial in that it insures preservation of operative feeding engagement between the abutment shoulder 70 and the upper edge of the blank being fed. As the feed arm 62 moves downwardly, pressure of the blanks remaining in the magazine 37 acts against the upper portion of the pivoted feed arm 62 and rocks the arm outwardly to the position shown in Fig. 7. By providing the recessed seat area 88, the blank being fed downwardly is permitted to follow the lateral rocking movement of the feed bar and to remain in feeding engagement with the feed shoulder 70.

When the blank reaches the position 14a, the spring pressed bar 84 serves to cooperate with the opposed portion of the guide 48 to frictionally grip the blank 14a to prevent it from gravitating downwardly, the blank being thereby retained in feeding engagement with the feed shoulder 70 after the blank is freed from the grip between the blanks in the magazine and the guide 48. Continuation of the downward movement of the feeding mechanism moves the blank downwardly between the guides 48 and 81 and across the inclined edge portions 89 of the guide bars 48, and thence downwardly through a throat portion 90 of the guide-way between said members 48 and 81 to a position indicated at 14b on a recessed seat 91 on the lower portion of the guide member 48 (see Figs. 6 and 8). A suitable wire spring 92 anchored in the guide 81 (see Fig. 15), serves to urge the blank 14 to the seated position shown in Fig. 8 just below the shoulder 93 at the upper end of said recessed seat 91 and to prevent the blank from gravitating from said position.

As the blank 14 reaches the seat 91, the feeding shoulder 70 is disengaged from the blank 14 by the action of an inclined cam surface 94 (Fig. 8) provided on the outside edge of the guide member 48. Said inclined cam surface 94 acts against an ear portion 95 of the member 62 to rock the feed arm 62 outwardly about its pivot 67.

From the disengaged position shown in Fig. 8, the feed arm 62 continues to move downwardly to a position represented in Fig. 9 during which the feed arms 62 are idle and merely moved downwardly in association with other elements of mechanism which constitute a male die or plunger which cooperates with the female die 24 to fold the tray blanks 1 and to apply the divider strips 14 to the folded blanks 1.

The plunger structure just referred to comprises a top plate 96 which is slotted as indicated at 97. The top plate 96 is suitably secured to the vertically movable cross head plate 57 as by being bolted thereto as indicated at 98 in Fig. 4. It will accordingly be understood that the plunger top plate and parts carried thereby move vertically with said cross head bar 57 and blank feeding elements already described.

The top member 96 of the plunger structure has attached to it a series of depending pairs of flanges, each pair comprising portions 99a and 99b (see Figs. 6, 7 and 13) which are separated from each other by amounts sufficient to permit passage of the divider blanks 14 between the adjacent ends of said members 99a and 99b without contact therewith. At their outer ends, these members 99a and 99b are connected by side walls 100 and 101 so that the main body of the plunger might be characterized as an inverted box which has end walls and intermediate partition walls slotted. A divider blank feeder has a horizontal top flange 102 seated on the top surface of the plunger member 96 and secured thereto by screws 103 (Fig. 14), and a vertical flange 104, depending through the slot 97 into the upper portion of the slot formed between the adjacent edges of aligned pairs of cross walls 99a and 99b. Suitably formed wire springs 105 (Figs. 6, 7 and 15) are anchored at their upper ends to a pair of the transverse wall portions 99a, said springs being provided to yieldingly press the blank 14 against the adjacent edges of the cross wall portions 99b when the blank is subsequently moved downwardly below the guides 48 and 81.

Said plunger structure also includes a bottom pressure plate comprising sections 106a and 106b (see Figs. 5 and 12) which are yieldingly urged downwardly from the lower edges of the plunger elements 99a and 99b by means of coil springs 107. These coil springs 107 are recessed into the plunger portions 99a and 99b and the portions thereof which are exposed between the pressure plate segments 106a and 106b and the lower edges of the plunger members 99a and 99b are kept from buckling by means of guide pins 108 which are anchored to the respective pressure plate segments and extend upwardly within the respective springs. Downward movement of the pressure plate segments under the pressure of the springs 107 is limited by hanger pins 109 which are anchored at their lower ends in the respective pressure plate segments and are slidable in holes bored in the overlying plunger members 99a and 99b. Collars 110 secured to the upper ends of said hanger pins 109 are movable in counter-bored portions of the guide holes for the pins 109 and serve to limit the spring-effected downward movement of said pressure plate segments 106a and 106b.

The pressure plate segments 106a and 106b, as best shown in Fig. 12, comprise a series of arms or fingers which are adapted to engage portions of the bottom panel 5 of the tray blank adjacent the hinge connections of the end wall 9 and the transverse partitions 10 and 11 of said bottom panel, and adjacent the free edge 6 of said bottom panel. The longitudinal side bar portions of said pressure plate segments engage the bottom panel 5 adjacent the fold lines 2 and 4 therein.

When the divider blank 14 is being delivered to the position 14b, the plunger structure carried by the cross head plate 57 is being lowered so that when the divider reaches the position 14b the said plunger structure has moved downwardly below the guide members 48 and 81 toward the stationary die 24. Hence, on one downward stroke of the feed mechanism and plunger carried by the cross head plate 57, the blank removed from the magazine is fed downwardly to a temporary or intermediate position 14b. Hence, when the machine is in normal operation, a divider will be in the position 14b each time that the plunger moves downwardly so that the vertical flange 104 of the plunger carried feeder plate will engage a blank in the position 14b and move it downwardly as will be readily understood by comparison of Figs. 6 and 7. The divider 14 in the position 14b of Fig. 6 has been moved downwardly in Fig. 7 to a point where the divider is emerging from the guide-way between the guide members 48 and 81. As soon as the blank leaves the guide member 48 the spring 105 which is a part of the plunger structure will press the blank against the adjacent edges of the plunger portions 99b so that the blank will be held in fixed position in and carried downwardly by the plunger structure during the continued downward movement thereof.

Assuming that a main body blank 1 has been delivered as already explained and placed on top of the die 24 (see Fig. 10), the pressure plates 106a and 106b of the plunger structure will ultimately come into engagement with such blank 1 and force the same downwardly in the die as shown in Fig. 11.

The die 24 includes outside wall portions 111 (Figs. 9 and 12) which have upper edges arranged to engage the marginal side portions 7 and 8 of the blank to fold the same upwardly when the blank is pushed downwardly between said side walls. Similarly, the die structure includes an end wall 112 (Figs. 10 and 12) with an upper edge arranged to engage and fold the end panel 9 of the blank, and folder elements 113 for folding the partition panels 10 and 11 upwardly when the blank is pushed down into the die as shown in Fig. 11.

The die 24 also includes a spring supported stripping plate 114, said plate being guided for vertical movement by guide pins 115 which are secured to the plate and depend therefrom through suitable openings provided in the bottom wall of the die structure as shown in Fig. 11. Springs 116 around the said guide pins 115 serve to yieldingly urge the stripper plate 114 to a normal up position in which it is shown in Figs. 4 and 10. Movement of the stripper plate is further guided by guide pins 117 (Figs. 5 and 16) which are fastened to the plate and slide in holes in underlying members of the die structure.

From a consideration of Figs. 10 and 11, it will be seen that during the initial portion of the downward movement of the blank 1 into the die 24, the portions 7, 8, 9, 10 and 11 of the blank will be folded upwardly. The transverse partition folders 111 are so positioned that they will effect folding of said transverse portions 10 and 11 shortly after the side wall and end partitions are folded upwardly. During the folding movement of the partitions 10 and 11, the flared entrances 17a and 18a to the slits 17 and 18 in the partitions, move into embracing relationship to the lower marginal portion of the divider 14 and the divider 14 is caused to enter the slits 17 and 18 even before the panels 10 and 11 reach their vertical positions, such entrance of the divider into the slits 17 and 18 being due in part to the upward folding movement of said panels 10 and 11 and in part to the downward movement of the divider 14 with the plunger structure. The partitions 10 and 11 are, however, folded to their vertical positions as shown in Fig. 11 prior to the time that the plunger structure reaches the lowermost position. During a terminal portion of the downward movement of the plunger and of the divider 14 being carried downwardly by the plunger, the divider is moved into fully assembled relation to the tray body so that the slits 15 and 16 in the divider are caused to embrace the lower portions of the partitions 10 and 11 and the slits 17 and 18 in said transverse partitions are caused to embrace the upper portions of the divider 14 in alignment with the said slits 15 and 16 therein. From its lowermost position as represented in Fig. 11, the plunger structure is retracted and the stripper plate 114 of the die structure ejects the formed and assembled tray structure from the die. The plunger structure and divider feeder return to starting position as represented in Fig. 5 in preparation for another cycle of operation. During the upward movement of the plunger structure the divider 14 in the position 14b (Figs. 8 and 9) is held by the shoulder 93 against upward movement incident to the upward drag applied to the divider by the plunger carried springs 105.

The cross head plate 57 which carries the divider blank feeder mechanism and the described plunger structure, is provided with an opening indicated at 118 through which the depending guide bars 48 and 81 depend. Similarly, the plunger top plate 96 is provided with suitable enlargements 119 of the opening 97 for permitting free passage of said guide elements 48 and 81.

For adapting the described mechanism to the setting up and assembling of other forms and sizes of trays, the magazine 37 may, in its entirety, be removed from the machine and replaced by another appropriate magazine. Such magazine changing involves principally the step of loosening the locking means (such as set screws as shown in Fig. 4) by which the hangers 52 are held in place on the posts 54, removing the hangers and parts carried thereby and replacement with another suitably formed magazine which may be mounted on the posts in the same manner as the magazine 37. The blank feeding structure and plunger are, in effect, a unitary structure carried by the plate 57 which is vertically slidably mounted on the posts 54. This unit of structure may also be readily replaced by another similar or dissimilar unit for handling divider blanks of another type or size.

The magazine 23 is supported by simple connections to the frame structure (as indicated in Fig. 1) so that said magazine 23 may also, in its entirety, be readily and quickly replaced with another for handling body blanks of another size or style. The die 24 is readily detachably and easily replaceably mounted on the table plate 55 by means of clips such as indicated at 123 (Figs. 2 and 4) which are bolted to the table 55 and have portions which enter into recesses provided in the opposite ends of the die structure for clamping the die against the top surface of said table plate 55. The opposite end walls of the die structure include portions which extend beyond the opening 55a in the plate 55 to support the die on the plate, other portions of the die extending through said opening which is made large to accommodate the various dies which may be mounted in the machine. The blank feed mechanism 25 usually needs no replacement or adjusting to adapt it to the feeding of different body blanks.

The assembled tray which is ejected from the die structure 24 by the stripper plate 114 is discharged laterally therefrom as an incident to the delivery of a blank 1 to said die structure. For that purpose, the structure which carries the vacuum grippers 25 is provided with a wire-formed bale-like projection 120 (see Figs. 1 and 5) which moves the assembled structure from the top of the die to a conveyor 121 (Fig. 1) which carries the assembled tray to the desired point for packing or other treatment. A suitable guide chute 122 may be provided intermediate the die 24 and the conveyor 121 to guide the discharged trays to the conveyor.

The described mechanism operates at a high rate of speed, is quite dependable, and requires a minimum amount of care and servicing by an operator. The mechanism is of fairly simple character and of low cost construction. The magazines for the tray parts, the feed mechanisms, and the die and plunger are easily replaceable to adapt the machine to setting up other forms and sizes of trays and various changes and refinements in the described structure may be made while retaining the principles involved in the structure described.

We claim:

1. Apparatus for forming a cellular tray having a body part provided with a partition folded upwardly from the bottom of the body part, and a separate divider assembled with said body part in transverse relation to said partition, the apparatus comprising a die, a plunger adapted to force a body blank into said die to effect folding of the partition to upstanding relation to the bottom of such body part, and means connected to said plunger for delivering a divider into assembled relation to the body part.

2. Apparatus for forming a cellular tray having a body part provided with a partition which is folded upwardly from the bottom of the body part, and a separate divider which is assembled with said body part in transverse relation to said partition, the apparatus comprising a normally stationary die, a reciprocable plunger structure adapted to force a body blank into said die to effect folding of the partition to upstanding relation to the bottom of the body part, and means connected to said plunger structure for delivering a divider into assembled relation to the body part as an incident to the plunger movement which effects folding of said body blank as aforesaid.

3. Apparatus of the class described comprising a die, means for successively delivering pre-cut and scored blanks into predetermined relationship to said die, a plunger movable into said die for cooperating therewith to effect folding of a blank delivered as aforesaid into a tray structure, means for actuating said plunger, means for automatically delivering a divider to said plunger, and said plunger having means for receiving such divider and delivering the same into assembled relationship to the tray at least partially as an incident to said tray forming movement of the plunger relative to the die.

4. Apparatus of the class described comprising a normally stationary die adapted to have tray blanks successively positioned thereover in predetermined relation thereto, a vertically movable plunger adapted to move toward and from and into and out of said die to form blanks delivered as aforesaid into trays, a magazine for supporting a stack of dividers, means for moving dividers one by one from said magazine and holding each divider in predetermined position relative to the path of travel of said plunger structure, and means carried by said plunger structure for gripping dividers held in said predetermined position and for carrying such dividers and delivering the same into assembled relation to the trays formed in said die.

5. Apparatus of the class described comprising a normally stationary die adapted to have tray blanks successively positioned thereover in predetermined relation thereto, a vertically movable plunger adapted to move toward and from and into and out of said die to form blanks delivered as aforesaid into trays, a magazine for supporting a stack of dividers, means movable with said plunger for moving dividers one by one from said magazine to a predetermined position as an incident to downward movement of said plunger, means for temporarily holding the successive dividers in said predetermined position, means carried by said plunger for gripping dividers held in said predetermined position and for carrying such dividers with the plunger into said die and into assembled relation to the tray formed in said die.

6. Apparatus of the class described comprising a normally stationary die adapted to have tray blanks successively positioned thereover in predetermined relation thereto, a vertically movable plunger adapted to move toward and from and into and out of said die to form blanks delivered as aforesaid into trays, a magazine for supporting a stack of vertically disposed dividers, means for moving dividers edgewise downwardly one by one from said magazine, normally stationary guide members for guiding said downward movement of the dividers, divider holding means carried by said guide means for temporarily holding a divider in predetermined position relative to the path of travel of said plunger, means carried by said plunger for gripping a divider held in said predetermined position and for carrying said divider downwardly with the plunger into said die and into assembled relation to a tray formed in said die by the entrance of the plunger into the die.

7. Apparatus of the class described comprising a die adapted to have tray blanks successively positioned in predetermined relation thereto, a plunger mounted for movement toward and from and into and out of said die for cooperating therewith to fold blanks positioned as aforesaid into trays, a magazine for supporting a stack of tray dividers, means for normally urging said stack of dividers to move toward an end of said magazine from which the dividers are to be discharged, means for feeding dividers one by one from said end of the magazine and operative to deliver such dividers to a predetermined position, means providing a guide-way for receiving and guiding said dividers to said predetermined position, said divider feed means comprising an arm mounted for reciprocating divider feed movement, said arm being also pivotally mounted for rocking movement toward and from the discharge end of the stack of dividers, said arm having an abutment for engaging an edge of a divider at the discharge end of said stack to thereby effect movement of the divider from said stack as an incident to divider feed movement of said arm relative to said magazine, a recessed seat in said divider guide means for permitting the divider being fed along said guide-way to move with said feeder arm in the direction in which the same is rocked by the pressure of said divider stack so as to thereby maintain effective feeding engagement between said feeder arm and the edge of the divider being fed, means in said guide-way for engaging a divider delivered to said predetermined position and operative to prevent reverse movement of said divider in said guide-way, said plunger structure being provided with means adapted, upon retraction of the plunger from said die, to engage dividers in said predetermined position and to carry such dividers into said die and into assembled relation to a tray thereupon formed in said die.

8. Apparatus of the class described comprising a die adapted to have tray blanks successively positioned in predetermined relation thereto, a plunger mounted for movement toward and from and into and out of said die for cooperating therewith to fold blanks positioned as aforesaid into trays, a horizontally extending magazine for supporting a horizontal stack of vertically positioned dividers, means for feeding dividers one by one vertically downwardly from said magazine and delivering such dividers to a predetermined position, a pair of mutually opposed, spaced guide members providing a guide-way therebetween for receiving the thickness of said dividers and guiding the movement thereof to said predetermined position, said divider feeding means comprising a vertically extending, vertically reciprocable arm having, adjacent its upper end, an abutment for engaging the upper edge of a divider in said magazine to thereby effect downward movement of the divider upon downward movement of said member, said arm being pivotally mounted for rocking movement toward and from the discharge end of a stack of dividers in said magazine, means for normally urging the stack of dividers to move toward and into engagement with said pivoted arm and tending to rock the same in the direction of movement of the divider stack, a recessed seat in said guide means for permitting the divider being fed edgewise by said pivoted arm to move with the rocking movement of said arm in the direction in which the same is rocked by the pressure of said divider stack, thereby to maintain effective feeding engagement between said arm and the upper edge of the dividers being fed, a pressure member provided in said guide-way for engaging dividers therein to prevent gravitation of the dividers through said guide-way, a second recessed seat in said guide-way spaced downwardly from the first recessed seat for receiving and positioning a divider in a predetermined position, means carried by said guide structure for yieldingly holding a divider in said predetermined position, said plunger being provided with means adapted to receive said divider in said predetermined position upon retraction of the plunger from said die structure, said plunger being also provided with means for yieldingly gripping said divider in said predetermined position and feeding the same downwardly from said guide means and carrying the same into said die and into assembled relation to the tray formed therein.

9. Apparatus for forming a cellular tray having a body part provided with a partition folded upwardly from the bottom of the body part, and a separate divider assembled with said body part in transverse relation to said partition, the apparatus comprising a die, a plunger adapted to force a body blank into said die to effect folding of the partition to upstanding relation to the bottom of such body part, means for actuating said plunger; means for automatically delivering a divider to said plunger, and said plunger having means for receiving such divider and delivering the same into assembled relation to the partition folded to upstanding position as aforesaid.

References Cited in the file of this patent

UNITED STATES PATENTS

| | | |
|---|---|---|
| 2,136,533 | Woodburn | Nov. 15, 1938 |
| 2,737,861 | Watson | Mar. 13, 1956 |
| 2,754,731 | Shields | July 17, 1956 |